US009323856B2

(12) United States Patent
Bokor et al.

(10) Patent No.: US 9,323,856 B2
(45) Date of Patent: Apr. 26, 2016

(54) URL VIRTUAL NAMING AND METADATA MAPPING

(75) Inventors: Brian R. Bokor, Raleigh, NC (US);
Daniel E. House, Raleigh, NC (US);
William B. Nicol, II, Durham, NC (US);
Peter F. Haggar, Raleigh, NC (US);
Andrew B. Smith, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 12/250,950

(22) Filed: Oct. 14, 2008

(65) Prior Publication Data

US 2010/0094890 A1 Apr. 15, 2010

(51) Int. Cl.
*G06F 17/30* (2006.01)
*H04L 29/08* (2006.01)
*G06F 9/54* (2006.01)
*G06F 9/455* (2006.01)

(52) U.S. Cl.
CPC .... *G06F 17/30876* (2013.01); *G06F 17/30398* (2013.01); *G06F 17/30595* (2013.01); *G06F 17/30864* (2013.01); *G06F 9/45508* (2013.01); *G06F 9/547* (2013.01); *H04L 29/08072* (2013.01)

(58) Field of Classification Search
CPC ............... G06F 17/30876; G06F 17/30864; G06F 17/30398; G06F 17/30595; G06F 9/547; G06F 9/45508; H04L 29/08072

USPC ............ 707/736, 724, 759, 802; 709/203; 717/139; 719/332
See application file for complete search history.

(56) References Cited

U.S. PATENT DOCUMENTS 7,373,377 B2 * 5/2008 Altieri ........................... 709/203
2007/0294676 A1 * 12/2007 Mellor et al. .................. 717/139
2008/0320503 A1 * 12/2008 Kruglick et al. ............... 719/332

OTHER PUBLICATIONS

Dawson R. Engler, M. Frans Kaashoek, James O'Toole Jr., Exokernel: an operating system architecture for application-level resource management, Mar. 24, 1995, M.I.T. Laboratory for Computer Science, pp. 1-17.*

* cited by examiner

*Primary Examiner* — Shahid Alam
(74) *Attorney, Agent, or Firm* — Moore & Van Allen PLLC

(57) ABSTRACT

Mapping of a universal resource locator (URL) to a virtual world location may include receiving a URL for access to an entity, accessing a mapping of the URL to coordinates of a location of the entity in a virtual world, and providing access to the entity in the virtual world. A device that may include a network interface, the network interface being configured to receive a URL and provide access to a virtual world, and a memory, the memory containing at least one mapping of a URL to coordinates in the virtual world.

23 Claims, 8 Drawing Sheets

URL VIRTUAL NAMING AND METADATA MAPPING

BACKGROUND OF THE INVENTION

The present invention is related to Uniform Resource Locator (URL) mapping, and more specifically to URL virtual naming and metadata mapping.

With current Internet routing, Domain Naming System (DNS) servers exist to provide a mapping of hostnames (e.g., www.electroniccity.com) to Internet Protocol (IP) address locations for the correct routing of the URL addresses to the appropriate server. When the address is qualified, for example: www.electroniccity.com/tv the unqualified URL (i.e., www.electroniccity.com) is used by DNS to locate the appropriate server, then that server resolves the "/tv" to a particular 2-dimensional (2D) web page that is then displayed in the user's browser. This poses a major flaw with 3-dimensional (3D) virtual world routing because 3D virtual world locations are not pages, but specific locations in a virtual world. These locations are typically based on an x,y,z coordinate system.

An attempt to solve this is the SLURL made popular by the Second Life Virtual World. It is a non-standard URL scheme that contains specific x,y,z coordinates. For example: http://slurl.com/secondlife/ElectronicCity%20Tech/132/15/23 may specify the x,y,z position (132, 15, 23) on an Electronic City (virtual store) island of Second Life. This solution is problematic for several reasons. It is not compatible with the existing URL scheme, it requires two different URLs depending on if you want to visit the 2D page or the 3D world (which may be problematic in the future as 2D and 3D experiences merge), and the SLURL breaks down when you move the electronic city store from one x,y,z coordinate to another. Therefore, when anything a web user has "bookmarked" within the virtual world moves (such as moving the TV section of Electronic City to another floor), the bookmark is broken if the URL representing the bookmark contains virtual world address coordinates, as in the Second Life SLURL or similar scheme.

BRIEF SUMMARY OF THE INVENTION

According to one aspect of the present invention, a method for mapping a universal resource locator (URL) to a virtual world location includes receiving a URL for access to an entity, accessing a mapping of the URL to coordinates of a location of the entity in a virtual world, and providing access to the entity in the virtual world.

According to another aspect of the present invention, a device includes a network interface, the network interface being configured to receive a URL and provide access to a virtual world, and a memory, the memory being configured to store at least one mapping of a URL to coordinates in the virtual world.

According to a further aspect of the present invention, a computer program product comprising a computer useable medium having computer useable program code embodied therewith, the computer useable program code comprising computer useable program code configured to receive a URL for access to an entity, computer useable program code configured to access a mapping of the URL to coordinates of a location of the entity in a virtual world, and computer useable program code configured to provide access to the entity in the virtual world.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
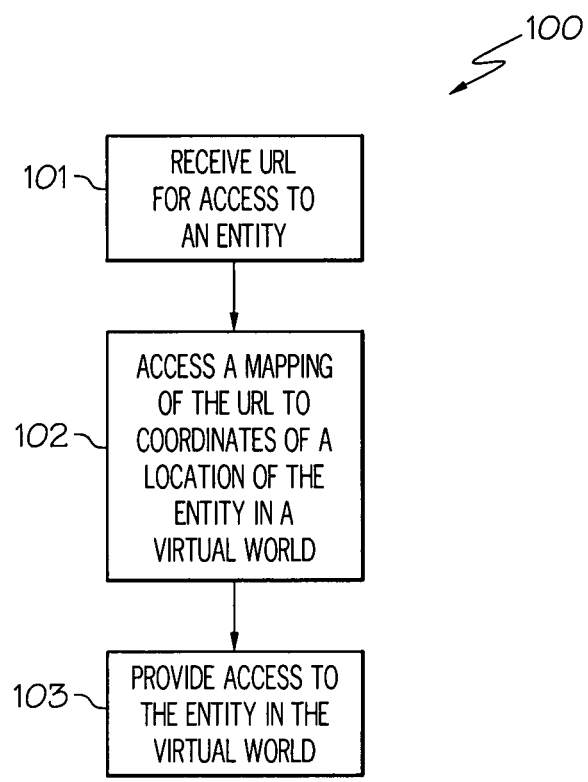
FIG. 1 is a flowchart of a process for mapping a URL to a location according to an exemplary embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention allow using current http URLs and domain names to correctly and effectively transport a user to the location in a 2D web environment or the user's avatar to a 3D Virtual World. A user/avatar may enter a URL or a SLURL and effectively be taken to the correct location. A SLURL and a URL are mapped to the appropriate location providing an easier mechanism to effectively bookmark locations in either the 2D or 3D environment using only standard URLs.

Embodiments according to the present invention may include a Virtual Naming System (VNS) and metadata storage mechanism that handle all Virtual World/3D traffic by providing a URL to metadata mapping containing specific references to coordinate mappings and coordinate information. The metadata contained within a Virtual Naming System may refer directly to URLs that already exist today. For instance www.electroniccity.com/tv may have an associated record within the VNS that selects the URL with some data (e.g., XML data). According to embodiments of the present invention, a VNS may be implemented using standard LDAP.

Metadata may be flexible to separate out content from a virtual world server so if an environment ever moved from one virtual world environment to a different virtual world environment (e.g., Second Life to Activeworlds), then only a metadata change on the VNS may be required for appropriate URL remapping depending on where the VNS is implemented (e.g., VNS implemented as a service in the Internet). If the VNS is implemented by a virtual world (e.g., Second Life, ActiveWorlds, or another virtual world operator) other changes may be required.

According to embodiments of the present invention, metadata may have an XML form similar to that shown below for extensibility. MetaData may be mapped and created from the virtual world server owner or a virtual world administrator. Metadata may be updated, in the case that a location moves, by someone responsible for updating the data to make sure that links do not break or take a user to an incorrect location. Example metadata is shown below, however, the present invention is not limited only to the illustrative metadata shown.

Example Metadata

```
<vns-record hostname="www.electroniccity.com">
  <root-node>
    <url-path-mapping>/</url-path-mapping>
    <virtual-world-type>SECOND_LIFE</virtual-world-type>
    <virtual-world-server>1.1.1.1</virtual-world-server>
    <virtual-world-coord>
      <x>2</x>
      <y>3</y>
      <z>0</z>
    </virtual-world-coord>
  </root-node>
  <url-tree-path>
    <tree>
      <node>
        <url-path-mapping>/tv</url-path-mapping>
        <virtual-world-type>SECOND_LIFE</virtual-world-type>
        <virtual-world-server>1.1.1.1</virtual-world-server>
        <virtual-world-coord>
          <x>2</x>
          <y>10</y>
          <z>5</z>
        </virtual-world-coord>
        <node>
          <url-path-mapping>/tv/sony</url-path-mapping>
          <virtual-world-type>SECOND_LIFE</virtual-world-type>
          <virtual-world-server>1.1.1.1</virtual-world-server>
          <virtual-world-coord>
            <x>2</x>
            <y>3</y>
            <z>0</z>
          </virtual-world-coord>
        </node>
      </node>
    </tree>
  </url-tree-path>
</vns-record>
```

According to embodiments of the present invention, HTTP URLs or forwarded HTTP URLs may be handled and all paths of the URL mapped to a tree-shaped mapping metadata of VNS. VNS may receive a request (e.g. 2D URL, 3D SLURL) and search a storage device for a record related to the URL containing the appropriate mapping. According to embodiments of the present invention a URL may map to a tree with nodes as in the URL so the only searching that may be needed is either an XPATH expression if it is XML or an LDAP search if it is in LDAP. As noted, metadata may be used to map the URL to the appropriate Virtual World System. The request may then be forwarded on to the appropriated Virtual World.

FIG. 1 shows a flowchart of a process for mapping a URL to a location according to an exemplary embodiment of the present invention. In the process 100 in block 101, a URL for access to an entity may be received. In block 102, a mapping of the URL to the coordinates of a location of the entity in a virtual world may be accessed. In block 103, access may be provided to the entity in the virtual world.

Figure 2:
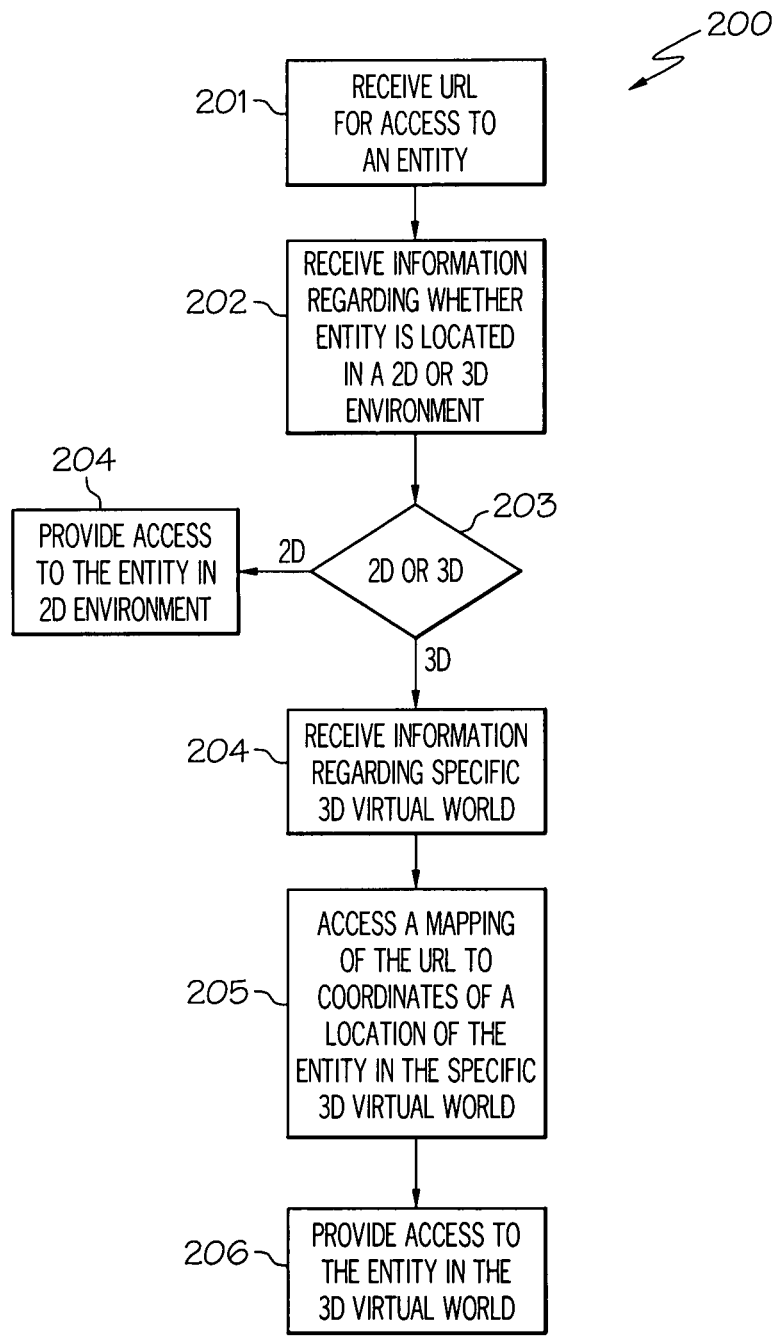
FIG. 2 is a flowchart of a process for mapping a URL to a location according to another exemplary embodiment of the present invention.

FIG. 2 shows a flowchart of a process for mapping a URL to a location according to another exemplary embodiment of the present invention. In the process 200, in block 201 a URL for access to an entity may be received. In block 202 information regarding whether the entity is located in a 2D environment or a 3D environment may be received. In block 203 it may be determined whether the entity is in the 2D environment or 3D environment and if in a 2D environment, then in block 204 access may be provided to the entity in the 2D environment. If the entity is in a 3D environment, then in block 205 information regarding a specific 3D virtual world may be received. In block 206 a mapping of the URL to coordinates of a location of the entity in the specific 3D virtual world may be accessed, and then, in block 207 access may be provided to the entity in the specific 3D virtual world.

Figure 3:
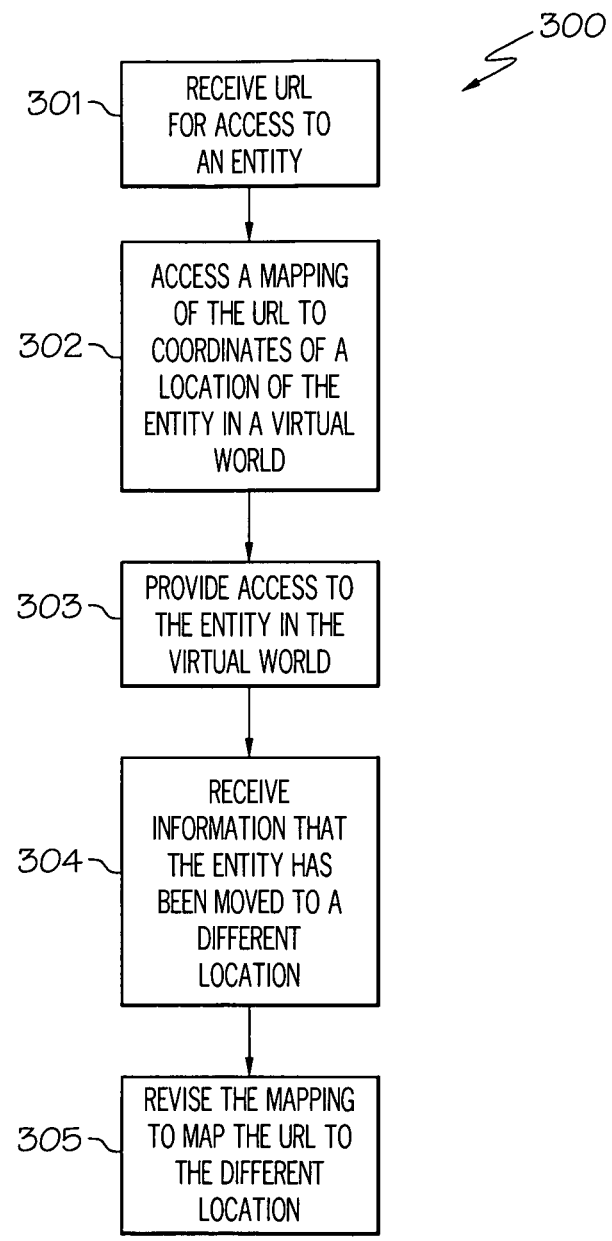
FIG. 3 is a flowchart of a process for mapping a URL to a virtual world location according to still another exemplary embodiment of the present invention.

FIG. 3 shows a flowchart of a process for mapping a URL to a virtual world location according to still another exemplary embodiment of the present invention. In the process 300 in block 301 a URL for access to an entity may be received. In block 302 a mapping of the URL to coordinates of the location of the entity in a virtual world may be accessed. In block 303, access may be provided to the entity in the virtual world. In block 304, information may be received that the entity has been moved to a different location. In block 305, the mapping may be revised to map the URL to the different location.

Figure 4:
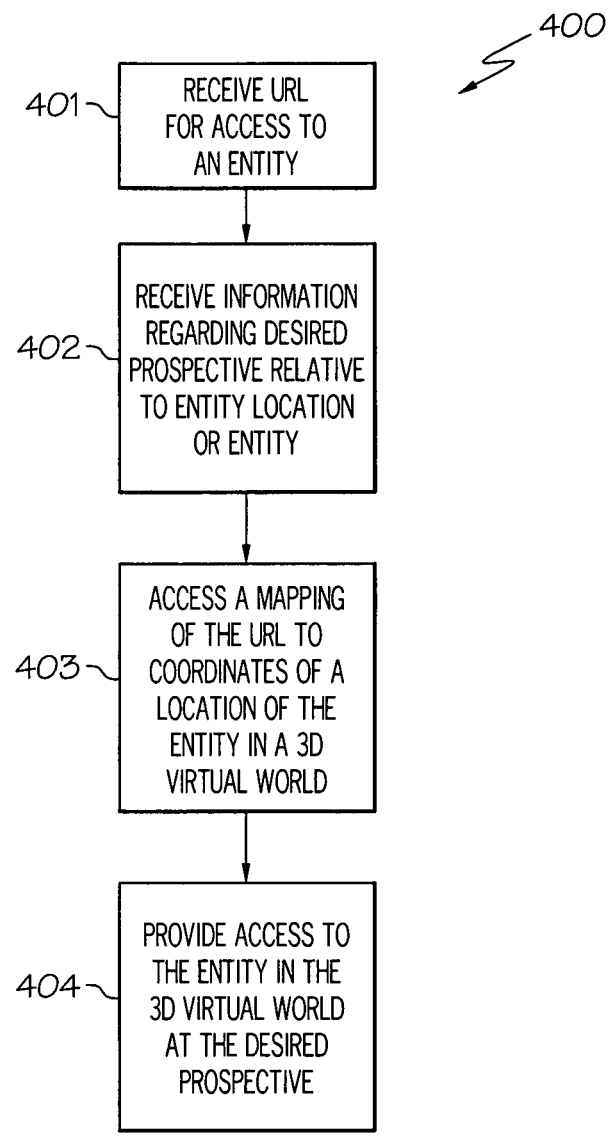
FIG. 4 is a flowchart of a process for mapping a URL to a desired prospective in a virtual world location according to an exemplary embodiment of the present invention.

FIG. 4 shows a flowchart of a process for mapping a URL to a desired prospective in a virtual world location according to an exemplary embodiment of the present invention. In the process 400 in block 401 a URL for access to an entity may be received. In block 402, information regarding a desired prospective view relative to the entity location or entity may be received. For example, it may be desired to view an entity from the front, from above, from a distance, etc. Further, it may be desired to be at a certain prospective at a particular location. For example, in a corner, in the middle, on the side, etc. In block 403, a mapping of the URL to coordinates of a location of the entity in a 3D virtual world may be accessed. In block 404, access may be provided to the entity in the 3D virtual world at the desired prospective.

Figure 5:
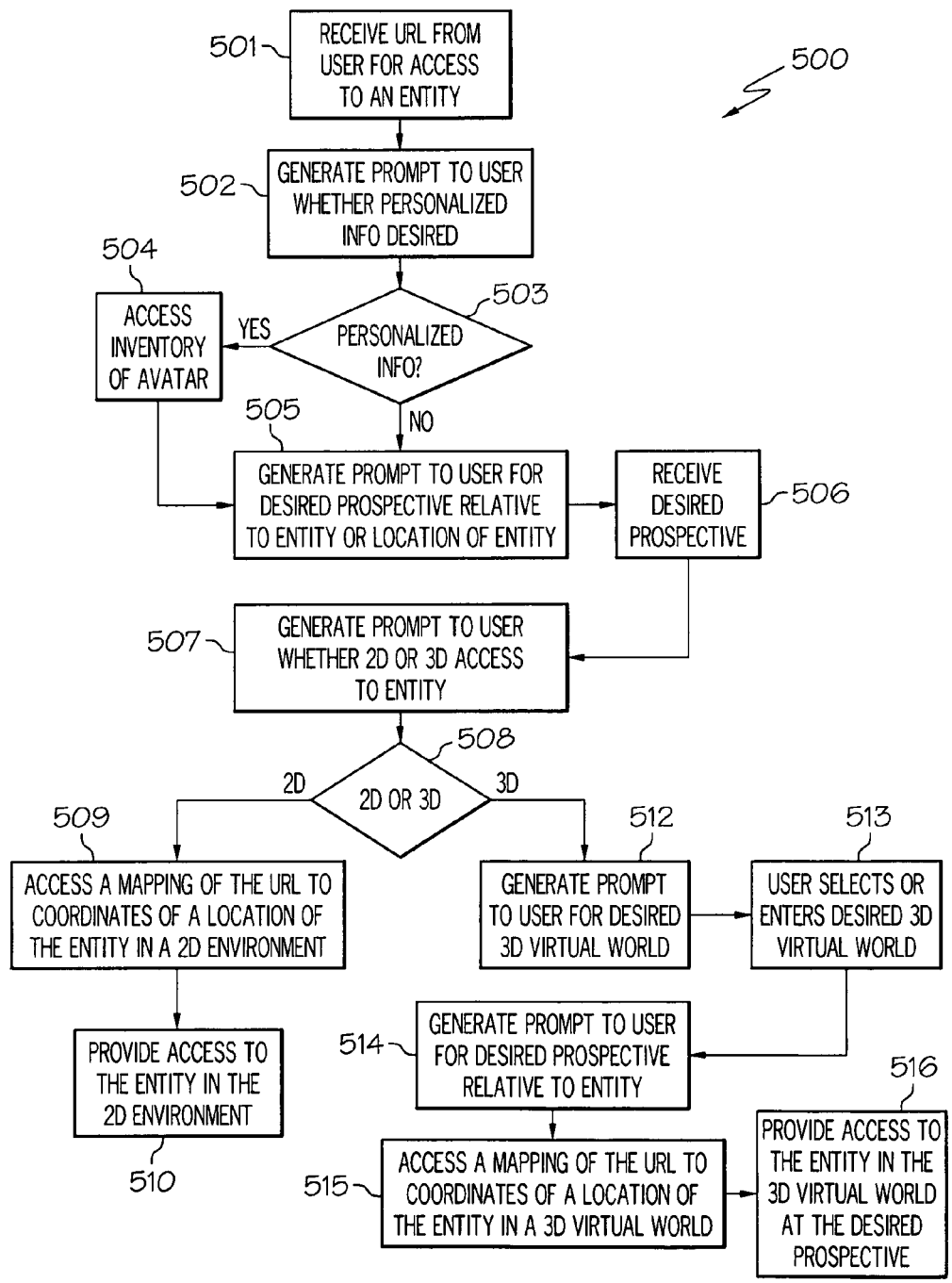
FIG. 5 is a flowchart of a process for mapping a URL to a virtual world location via prompting a user according to an exemplary embodiment of the present invention.

FIG. 5 shows a flowchart of a process for mapping a URL to a virtual world location via prompting a user according to an exemplary embodiment of the present invention. In the process 500 in block 501, a URL from a user may be received for access to an entity. In block 502, a prompt to the user may be generated asking whether personalized information is desired. In block 503, it may be determined if personalized information is desired and, if so, in block 504 an inventory of the avatar may be accessed to identify personalized information. In block 505, a prompt to the user may be generated for a desired prospective relative to the entity or location of the entity. In block 506, a desired prospective may be received from the user. In block 507, a prompt may be generated to the user asking whether a 2D location or 3D location access to the entity is desired. In block 508, it may be determined whether the user replied with 2D or 3D environment access to the entity. If the user desires a 2D access to the entity, then in block 509, a mapping of the URL to coordinates of a location of the entity in a 2D environment may be accessed and in block 510, access may be provided to the entity in the 2D environment. If the user desires access to the entity in a 3D environment, then in block 512, a prompt may be generated to the user requesting a specific desired virtual world. In block 513, the user may select or enter a desired 3D virtual world. In block 514, a prompt may be generated to the user asking for a desired prospective relative to the entity. In block 515, a mapping of the URL to coordinates of the location of the entity in the 3D virtual world may be accessed and in block 516, access to the entity in the 3D virtual world at the desired prospective may be provided.

Figure 6:
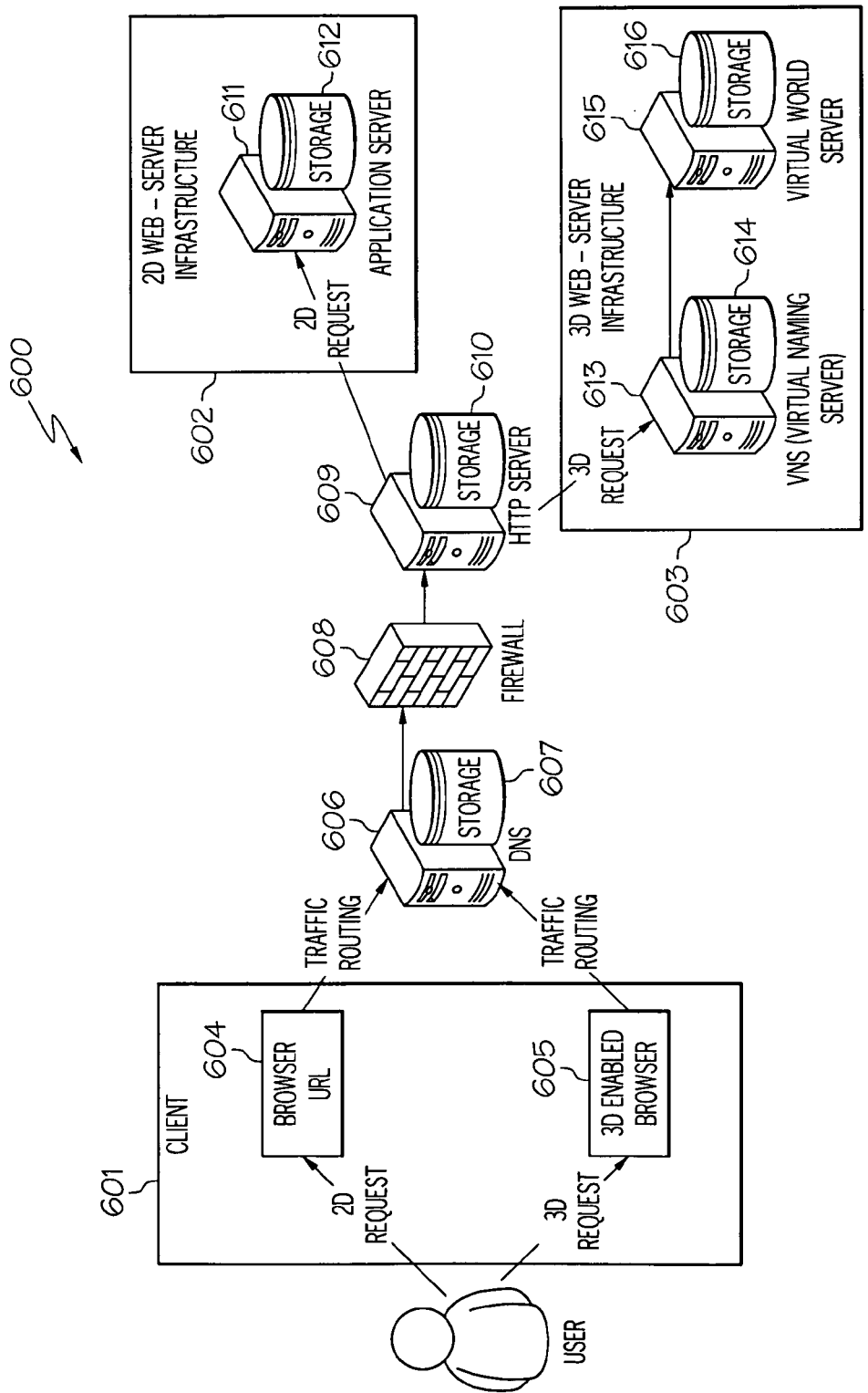
FIG. 6 is diagram of a system for mapping a URL to a virtual world location according to an exemplary embodiment of the present invention.

FIG. 6 shows a system for mapping a URL to a virtual world location according to an exemplary embodiment of the present invention. The system 600 may include a client device 601, a 2D Web-Server Infrastructure 602, a 3D Web-Server Infrastructure 603, a Domain Name System (DMS) 606, a firewall 608, and an Hypertext Transfer Protocol (HTTP) server 609. The client device 601 may include a browser 604 capable of accessing a URL, and/or a 3D enabled browser or client. The browser or 3D enabled client 605 may consist of software comprising a downloadable installable client. A user at the client device 601 may enter a 2D request for access to an entity or location in the browser 604 whereby the browser 604 routes the request to the DNS 606. Moreover, the user may initiate a 3D request via the 3D enabled browser 605 for access to an entity or location in a virtual world where the request is routed to the DNS 606. The DNS 606 may have an associated storage 607. The DNS 606 may route received requests to a firewall 608 which may reside between the DNS and an HTTP server 609. The HTTP server may have an associated storage 610. The HTTP server may be configured identify whether the request is a 2D request or a 3D request. If the request is a 2D request, the HTTP server 609 may send the 2D request to the appropriate application server 611 at the 2D Web-Server Infrastructure 602. The application server 611 may provide the requested information (2D web page, data, etc.) associated with the URL in the 2D request. This information may be retrieved from a storage device 612 accessible by the application server 611.

Further, if the HTTP server 609 identifies the request as a 3D request, the HTTP server 609 may forward the 3D request to a Virtual Naming Server 613 at the 3D Web-Server Infrastructure 603. The Virtual Naming Server 613 may access a virtual world being hosted by a virtual world server 615 of the 3D Web-Server Infrastructure 603 based on the 3D request. An entity or a location within the virtual world associated with the Virtual World Server 615 may be accessed in accordance with the 3D request of the user. The Virtual Naming Server 613 may contain or access a mapping of the 3D URL contained in the 3D request to coordinates of a location of an entity, or the location, in the virtual world managed by the Virtual World Server 615. The mapping may be accessed from a storage device 614.

Figure 7:
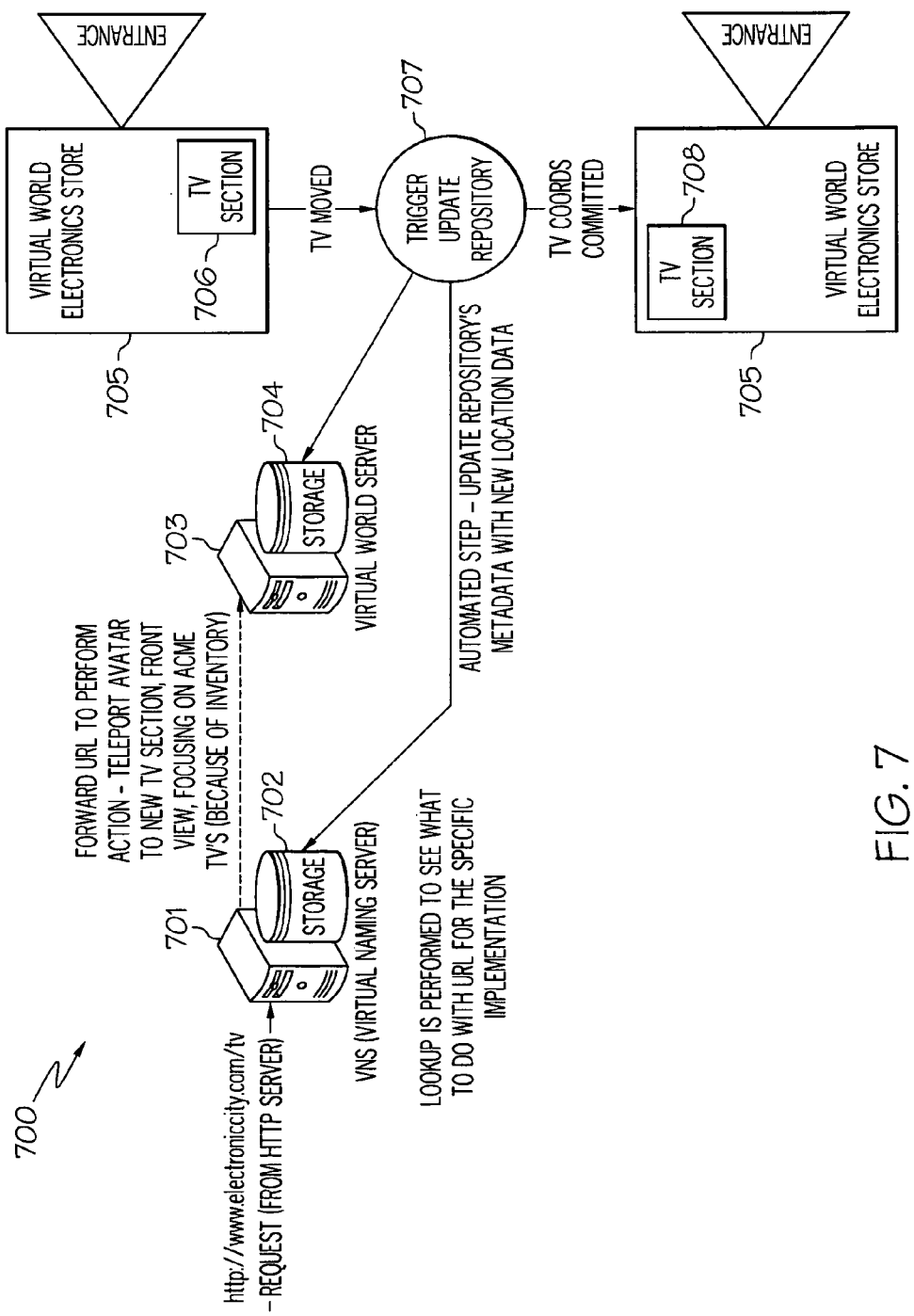
FIG. 7 is a diagram of a system for URL mapping to a virtual world location according to another exemplary embodiment of the present invention.

FIG. 7 shows a diagram of a system for URL mapping to a virtual world location according to another exemplary embodiment of the present invention. The system 700 may include a Virtual Naming Server 701, a virtual world server 703, and a virtual world environment 705. The Virtual Naming Server 701 may receive a request containing a URL for access to an entity or location in a 3D virtual world. The Virtual Naming Server 701 may access a mapping of the received URL to coordinates of a location of the entity or location in the virtual world. The mapping may reside on a storage 702 accessible by the Virtual Naming Server 701. The Virtual Naming Server 701 may then provide the coordinates to the virtual world server 703 for access to a virtual world location 705 or a virtual world entity 706 at the virtual world location 705. If an entity 706 at a virtual world location 705 is moved to a different location 708 in the virtual world environment 705, an alert or trigger 707 may be generated to the virtual world server 703 and/or the Virtual Naming Server 701. For example, if a TV section is the entity 706 at the virtual world location 705 (e.g., an electronics department at a virtual world store) and a store manager decides to move the TV section to a different location in the virtual world location 705, this movement may be detected and a trigger generated to update a repository containing the current location of this entity 706 (i.e., TV section) in the virtual world. The new location may be used by the Virtual Naming Server 701 to revise the mapping of a URL to the location of the entity 706 in the virtual world location 705.

Figure 8:
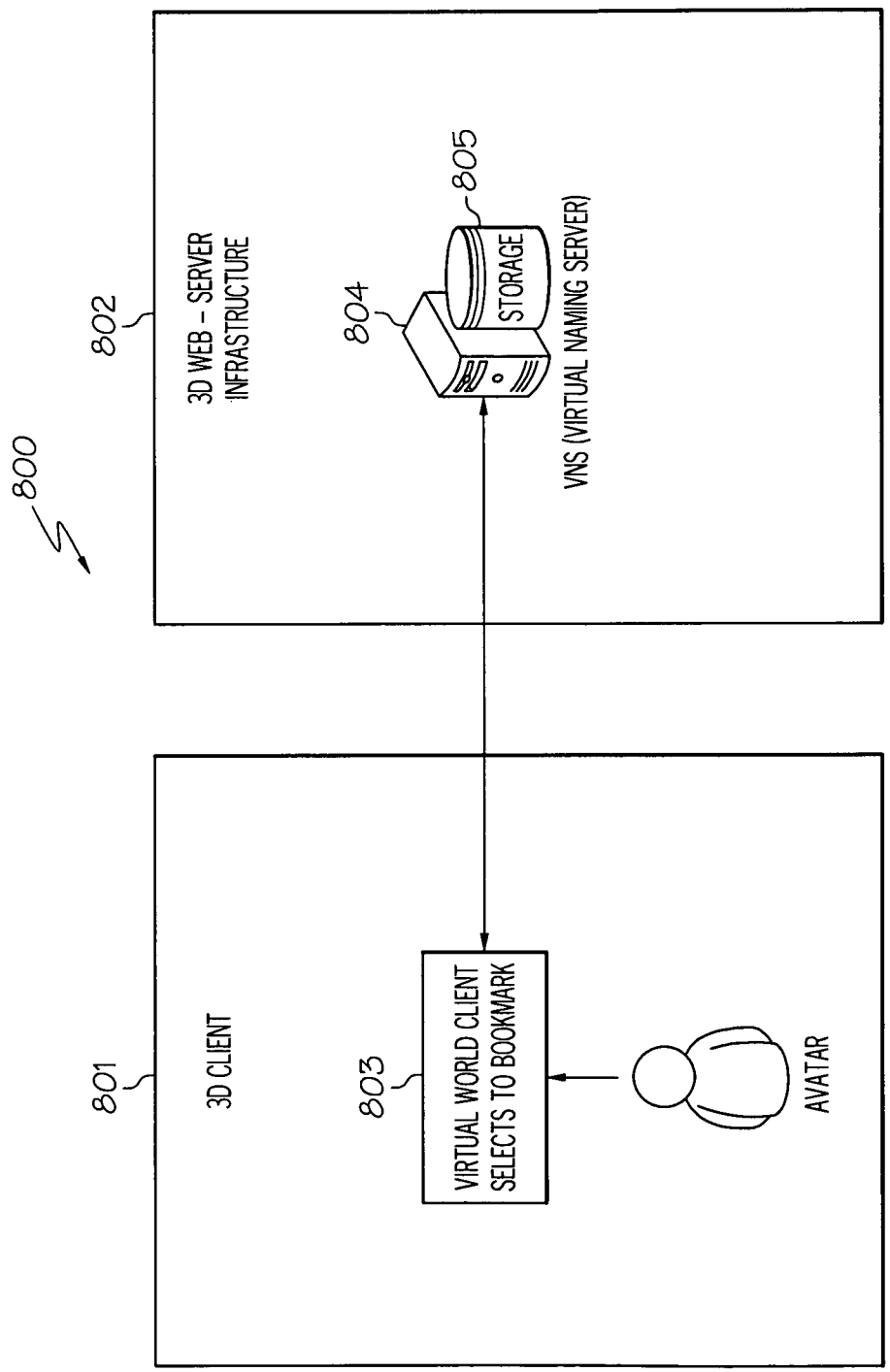
FIG. 8 is a diagram of a system for URL mapping to a virtual world location according to a further exemplary embodiment of the present invention.

FIG. 8 shows a diagram of a system for URL mapping to a virtual world location according to a further exemplary embodiment of the present invention. The system 800 may include a 3D client device 801 interconnected to a 3D Web-Server Infrastructure 802 where the 3D Web-Server Infrastructure 802 includes a Virtual Naming Server 804 and an associated storage device 805. A user at a 3D client device 801 may select to bookmark a URL associated with a location or entity in a 3D virtual world. The Virtual Naming Server 804 may manage a mapping between the URL and the entity or location in the 3D virtual world. If the entity in the 3D virtual world moves to a new location, the Virtual Naming Server 804 may revise the mapping accordingly. Further, if the location in the virtual world moves or changes position, the Virtual Naming Server 804 may revise the mapping accordingly. Therefore, a user or avatar may have a bookmark 803 to a URL to an entity or location in a virtual world where the bookmark is valid regardless of movement of the entity or location in the virtual world.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for mapping a universal resource locator (URL) to a virtual world location comprising:
receiving, by a processor of a domain name system (DNS) server, a URL entered by a user for access to an entity;
presenting, by the processor, an option to the user for selecting one of accessing the entity in a 2-Dimensional environment or a 3-Dimensional virtual world;
routing the URL from the DNS server to a hypertext transport protocol (HTTP) server, wherein the HTTP server is configured to identify the user selecting one of accessing the entity in the 2-Dimensional environment or the 3-Dimensional virtual world;
routing the URL to a 2-Dimensional web server infrastructure in response to the user selecting the 2-Dimensional environment;
routing the URL to a 3-Dimensional web server infrastructure in response to the user selecting the 3-Dimensional virtual world;
accessing, by the processor, a mapping of the URL to coordinates of a location of the entity in the 3-Dimensional virtual world in response to the user selecting to access the entity in the 3-Dimensional virtual world; and
providing, by the processor, the coordinates for access to the entity in the 3-Dimensional virtual world.

2. The method according to claim 1, wherein the mapping comprises metadata mapping the URL to the coordinates of the location in the virtual world.

3. The method according to claim 2, wherein the mapping comprises metadata mapping the URL to the coordinates of the location in one specific virtual world of at least two three-dimensional (3D) virtual worlds having the entity.

4. The method according to claim 2, wherein the metadata comprises a data structure.

5. The method according to claim 4, wherein the mapping the URL to the coordinates of the location in the virtual world comprises one of Extensible Markup Language (XML) and Lightweight Directory Access Protocol (LDAP).

6. The method according to claim 1, further comprising revising the mapping responsive to movement of the entity to a new location, the mapping being revised to map the URL to the new location.

7. The method according to claim 6, wherein revising the mapping responsive to movement of the entity to the new location is performed automatically.

8. The method according to claim 1, further comprising accessing a virtual naming system (VNS) to access the mapping of the URL to coordinates of the location in the virtual world.

9. The method according to claim 1, wherein the mapping further comprises user prospective placement information relative to at least one of the location or an object at the location.

10. The method according to claim 1, further comprising receiving information regarding an inventory of an avatar, the inventory information being useable to personalize the access to the location in the virtual world.

11. The method according to claim 1, further comprising generating at least one prompt offering available options related to the location before providing access to the location in the virtual world.

12. The method according to claim 1, further comprising receiving information regarding accessing the entity in one of a two-dimensional (2D) environment and in a three-dimensional (3D) virtual world.

13. The method according to claim 12, further comprising receiving the information in a Hypertext Transfer Protocol (HTTP) header.

14. The method according to claim 1, further comprising receiving information regarding accessing the entity in a specific virtual world.

15. The method according to claim 14, further comprising receiving the information in a Hypertext Transfer Protocol (HTTP) header regarding accessing the entity in the specific virtual world.

16. A device comprising:
a processor of a domain name system (DNS) server for receiving a URL entered by a user for access to an entity;
a module operating on the processor, the module being configured to perform a set of functions comprising
presenting an option to the user for selecting one of accessing the entity in a 2-Dimensional environment or a 3-Dimensional virtual world;
routing the URL from the DNS server to a hypertext transport protocol (HTTP) server, wherein the HTTP server is configured to identify the user selecting one of accessing the entity in the 2-Dimensional environment or the 3-Dimensional virtual world;
routing the URL to a 2-Dimensional web server infrastructure in response to the user selecting the 2-Dimensional environment;
routing the URL to a 3-Dimensional web server infrastructure in response to the user selecting the 3-Dimensional virtual world;
accessing a mapping of the URL to coordinates of a location of the entity in the 3-Dimensional virtual world in response to the user selecting to access the entity in the 3-Dimensional virtual world; and
providing the coordinates for access to the entity in the 3-Dimensional virtual world.

17. The device according to claim 16, wherein the device comprises a server.

18. The device according to claim 16, wherein the coordinates define a location of an entity in the virtual world, the mapping of the URL to the coordinates of the location of the entity being automatically revised to map the URL to new coordinates responsive to the entity being moved to a second location at the new coordinates in the virtual world.

19. A computer program product comprising a non-transitory computer useable storage medium having computer useable program code embodied therewith, the computer useable program code comprising:

computer useable program code configured to receive a URL entered by a user for access to an entity, the URL being received by a domain name system (DNS) server;

computer useable program code configured to present an option to the user for selecting one of accessing the entity in a 2-Dimensional environment or a 3-Dimensional virtual world, the URL being routed from the DNS server to a hypertext transport protocol (HTTP) server, wherein the HTTP server is configured to identify the user selecting one of accessing the entity in the 2-Dimensional environment or the 3-Dimensional virtual world and the URL being routed to a 2-Dimensional web server infrastructure in response to the user selecting the 2-Dimensional environment or the URL being routed to a 3-Dimensional web server infrastructure in response to the user selecting the 3-Dimensional virtual world;

computer useable program code configured to access a mapping of the URL to coordinates of a location of the entity in the 3-Dimensional virtual world in response to the user selecting to access the entity in the 3-Dimensional virtual world; and computer useable program code configured to provide the coordinates for access to the entity in the 3-Dimensional virtual world.

20. The computer program product according to claim 19, further comprising computer useable program code configured to revise the mapping responsive to movement of the entity to a new location, the mapping being revised to map the URL to the new location.

21. The method of claim 1, wherein routing the URL to the 3-Dimensional web server infrastructure comprises:

routing the URL to a virtual naming server (VNS) of the 3-Dimensional web server infrastructure; and accessing by the VNS the 3-Dimensional virtual world hosted by a virtual world server of the 3-Dimensional web server infrastructure, the VNS comprising the mapping of the URL to coordinates of the location of the entity in the 3-Dimensional virtual world.

22. The method of claim 1, further comprising:

generating a prompt to the user to select a desired perspective view from a plurality of perspective views relative to the location of the entity in the 3-Dimensional virtual world in response to the user selecting to access the entity in the 3-Dimensional virtual world; and providing access to the entity in the 3-Dimensional virtual world at the desired perspective view.

23. The method of claim 22, wherein the plurality of perspective views relative to the location of the entity comprises a view from a particular location relative to the entity, a front view, a view from above the entity and a view from a certain distance from the entity.

* * * * *